United States Patent [19]

Yeh

[11] Patent Number: 4,548,479
[45] Date of Patent: Oct. 22, 1985

[54] ISOPHASE BIREFRINGENT FILTERS

[75] Inventor: Pochi A. Yeh, Thousand Oaks, Calif.

[73] Assignee: Rockwell International Corporation, El Segundo, Calif.

[21] Appl. No.: 481,438

[22] Filed: Apr. 1, 1983

[51] Int. Cl.⁴ .............................................. G02F 1/23
[52] U.S. Cl. .................................................. 350/404
[58] Field of Search ................ 350/404, 374, 408, 407

[56] References Cited

U.S. PATENT DOCUMENTS

| | | |
|---|---|---|
| 4,129,357 | 12/1978 | Title . |
| 4,197,008 | 4/1980 | Pinnow et al. . |
| 4,229,073 | 10/1980 | Lotspeich . |
| 4,239,349 | 12/1980 | Scheffer . |
| 4,247,166 | 1/1981 | Yeh . |
| 4,273,411 | 6/1981 | Alferness . |

OTHER PUBLICATIONS

Leroy, "Sole Elements in Lyot-Ohman Filters" J. Optics (Paris) 1980, vol. II, No. 5, pp. 293-304.
Lotspeich, Iso-Index Coupled-Wave Electrooptic Filter, QE-15 I.E.E.E. J. Quan. Elec. 904, (1979).
Pinnow, et al., An Electro-Optic Tunable Filter, 34 Appl. Phys. Lett. 391, (1979).
Yeh, Zero Crossing Birefringent Filters, 35 Optics Comm. 15, (1980).
Evans, The Birefringent Filter, 39 J. Opt. Soc. Am. 229, (1949).
Evans, Solc Birefringent Filter, 48 J. Opt. Soc. Am. 142, (1958).
Henry, Coupling of Electromagnetic Waves in CdS, 143 Phys. Rev. 627, (1966).

Primary Examiner—Bruce Y. Arnold
Attorney, Agent, or Firm—H. Fredrick Hamann; Craig O. Malin; John J. Deinken

[57] ABSTRACT

An optical filter includes a first polarizer for transmitting light having a first polarization direction and a first birefringent element for receiving the light transmitted by the first polarizer. A second birefringent element, of a different material having a different birefringence, receives the light transmitted by the first element, while a second polarizer receives the light transmitted by the second element and transmits the portion having a second polarization direction. The birefringences and the thicknesses of the elements are arranged to effect a predetermined amount of net phase retardation, preferably zero, for light of a wavelength $\lambda$ in traversing the first and second elements.

26 Claims, 6 Drawing Figures

ISOPHASE BIREFRINGENT FILTERS

BACKGROUND OF THE INVENTION

This invention relates to optical filters for electromagnetic radiation and, in particular, to filters utilizing birefringent elements.

Recent interest in laser communications systems operating in scattering media has motivated the development of spectral filter structures capable of providing an extremely narrow bandwidth over a very wide field of view. A narrow bandwidth is necessary to reject unwanted background light and thereby achieve a satisfactory signal to noise ratio, while a large angular aperture is required to facilitate the receipt of as much of the scattered signal radiation as possible.

Attention in this research has increasingly focussed on employing the natural dispersion of materials to produce new filter concepts, including Christiansen-Bragg filters, dispersive birefringent filters, and filters using the zero crossing of birefringence in certain uniaxial crystals. Two basic versions of birefringent filters, known as Lyot-Ohman and Solc filters, are familiar in the art. These filters consist of one or more birefringent crystal plates placed between polarizers and operate by virtue of the interference of polarized light. To achieve polarization interference, such a filter is designed to introduce an appropriate phase retardation between the components of the filtered light polarized parallel and perpendicular to the optic axes of the crystal plates.

The field-of-view of the basic Lyot-Ohman and Solc filter designs is too restricted for modern communications systems. By selecting a crystal material exhibiting a strong dispersion in its birefringence, however, a filter can be designed with a vary narrow bandwidth capability while concurrently accommodating a wide field-of-view. Nevertheless, this approach is limited to filter operation in the spectral regime near an iso-index point or near the optical band edge. Thus, the passband of such a filter can be selected from only a relatively small wavelength region.

As a consequence of these limitations, existing filter designs cannot provide the requisite performance at all desired wavelengths. A need has therefore developed for a birefringent filter design which can be readily adjusted to provide a very narrow passband with a wide field-of-view over a broad range of the spectrum.

SUMMARY OF THE INVENTION

It is a general objective of this invention to provide a new and improved optical filter.

The filter of this invention broadly includes a first polarizer for transmitting light having a first polarization direction and a first birefringent element, with a birefringence $\Delta n_1$, for receiving the light transmitted by the first polarizer. A second birefringent element, with a birefringence $\Delta n_2$, receives the light transmitted by the first element, while a second polarizer receives the light transmitted by the second element and transmits the portion thereof having a second polarization direction. The birefringences and the thicknesses of the elements are arranged to effect a predetermined amount of net phase retardation for light of the wavelength $\lambda$ in traversing the first and second elements.

In more particular embodiments, the birefringences and the thicknesses are arranged to effect a net phase retardation of zero or of an odd or even multiple of $\pi$. Furthermore, where the birefringences $\Delta n_1$ and $\Delta n_2$ are of opposite sign, the optic-axis of the first element may be rotated 45° with respect to the first polarization direction while the optic axis of the second element is maintained parallel to the first optic axis. Where the birefringences are of the same sign, the optic axes are placed perpendicular to each other. In either case, the second polarization direction can be set parallel or perpendicular to the first polarization direction.

In one multi-stage embodiment, the filter includes a plurality of stages, with each stage having first and second birefringent elements analagous to those described above, and with the thickness of each element in each stage twice that of the corresponding element in the preceding stage. An initial polarizer precedes the first stage, a final polarizer follows the last stage, and an intermediate polarizer is placed between each stage and the preceding stage.

In a fan Solc embodiment of the multi-stage filter, the first optic axis in the nth stage makes an angle of $\rho(2n-1)$ with respect to the first polarization direction, where $\rho=45°/N$ and N is the total number of stages. In a folded Solc embodiment, the first optic axis in the nth stage makes an angle of $(-1^{n-1}\rho$ with respect to the first polarization direction.

DESCRIPTION OF THE DRAWINGS

Additional details of the invention are presented below in the section entitled Description of the Invention, which refers to the drawings, where.

DESCRIPTION OF THE INVENTION

This invention involves a new design for birefringent filters which incorporates two different birefringent materials to facilitate the construction of a narrowband, wide field of view filter with a broad range of possible passband wavelengths. The construction and operation of these filters depends upon the phenomena of double refraction and polarization interference. When a beam of unpolarized light traverses a birefringent crystal, two refracted beams will occur in place of the usual one. This phenomena is called double refraction. Snell's law of refraction holds for one of these rays, known as the ordinary or o ray, but not for the other ray, which is denoted the extraordinary or e ray. In a negative uniaxial crystal, the extraordinary index of refraction $n_e$ is less than the ordinary index $n_o$, i.e., $n_e - n_o < 0$, while in a positive crystal, $n_e - n_o > 0$.

If such a birefringent crystal is uniaxial, it is characterized by a single direction called the optic axis. The o and e components of light travelling perpendicular to the optic axis will not separate, but those components will propagate through the crystal with different velocities. Biaxial crystals behave similarly, except that there are two optic axes in those materials.

The behavior of plane polarized light in a birefringent material depends upon these characteristics. Upon entering the crystal with electromagnetic vibrations at an angle to the optic axis, the light will be resolved into an e component vibrating parallel to the optic axis and an o component vibrating perpendicular to the optic axis. The e wave will travel faster than the o wave, leading to an optical path difference $\Delta$:

$$\Delta = d(n_e - n_o) \quad (1)$$

where d is the thickness of the crystal. The corresponding phase difference $\Gamma$ for light of wavelength $\lambda$ is:

$$\Gamma = \frac{2\pi}{\lambda} d(n_e - n_o) \quad (2)$$

Thus, within the crystal there are, at any given point, two vibrations at right angles and with a phase difference of $\Gamma$. The resultant motion is one of the various Lissajous figures for equal frequencies, i.e., an ellipse, a circle, or a straight line. For a phase difference which is an even multiple of $\pi (\Gamma = 0, 2\pi, 4\pi, \ldots)$ the direction and linearity of the incident vibrations will be unchanged in the light emerging from the crystal, while phase differences which are odd multiples of $\pi (\Gamma = \pi, 3\pi, 5\pi, \ldots)$ will transform the emerging light into another linear vibration making an angle of $2\alpha$ with the original polarization direction, where $\alpha$ is the angle between the original polarization direction and the optic axis of the crystal.

Because the refractive indices of birefringent materials are generally dispersive, i.e., vary with wavelength, a filter effect may be achieved through polarization interference by passing the emerging light through a polarizer. If the polarizer, for example, is placed with its polarization direction parallel to the polarization of the incident light, the spectrum of the light emerging from the polarizer will include regularly spaced bright fringes at wavelengths for which the phase difference $\Gamma$ is an integral multiple of $2\pi$.

Birefringent interference filters, which use this effect, consist of linear sequences of birefringent crystal plates and linear polarizers. In the Lyot-Ohman geometry, for example, individual waveplates are oriented between linear polarizers with the optic axes of the waveplates oriented at 45° with respect to the polarization axes of the polarizers. Each plate is twice the thickness of the previous one, resulting in a transmission spectrum consisting of isolated transmission bands whose width is determined by the thickest stage and having a free spectral range defined by the thinnest stage.

In order to provide a very narrow bandwidth while at the same time accomodate a wide field-of-view, the overall phase retardation $\Gamma$ of each birefringent element must be a fast varying function of wavelength and must be virtually independent of the angle of incidence. This can be achieved by using anomalously dispersive birefringent materials operating in the spectral regime near the iso-index point. See Yeh, Dispersive Birefringent Filters, Optics Communications, Vol. 37, p. 153 (1981). The passband of such a filter, however, is limited to a small region around the iso-index wavelength.

The present invention avoids such a limitation on the choice of passband wavelength by combining in a birefringent filter two birefringent materials. Consider, for example, a filter in which each stage includes two plates of different crystals with parallel optic axes (c axes) and opposite signs of birefringence (i.e., one is negative, $n_e - n_o < 0$ and one is positive, $n_e - n_o < 0$). The overall phase retardation introduced by such a combination when radiation passes through it is given by:

$$\Gamma = \Gamma_1 + \Gamma_2 = \frac{2\pi}{\lambda} (\Delta n_1 d_1 + \Delta n_2 d_2) \quad (3)$$

where $\lambda$ is the wavelength of the light, $\Delta n_1 = n_{e1} - n_{o1}$ is the birefringence of the first crystal, $\Delta n_2 = n_{e2} - n_{o2}$ is the birefringence of the second crystal, $d_1$ is the first plate thickness, and $d_2$ is the second plate thickness.

If the plate thicknesses are chosen so that $\Gamma_1$ and $\Gamma_2$, the phase retardation of the first and second plates, are equal in magnitude and opposite in sign, the overall phase retardation $\Gamma$ will be zero. Since the materials are dispersive, this isophase condition will occur at only one wavelength $\lambda_o$. Moreover, the iso-phase point can be located at any wavelength over a wide spectral regime by choosing different plate thickness combinations.

For radiation at the wavelength $\lambda_o$, the filter is a zero wave plate and, therefore, the polarization state of this light will be preserved. At other wavelengths the phase retardation will not be zero and the polarization state will change. Thus light at the wavelength $\lambda_o$ will pass through the filter without interference, while light at other wavelengths will be discriminated against.

Figure 1:
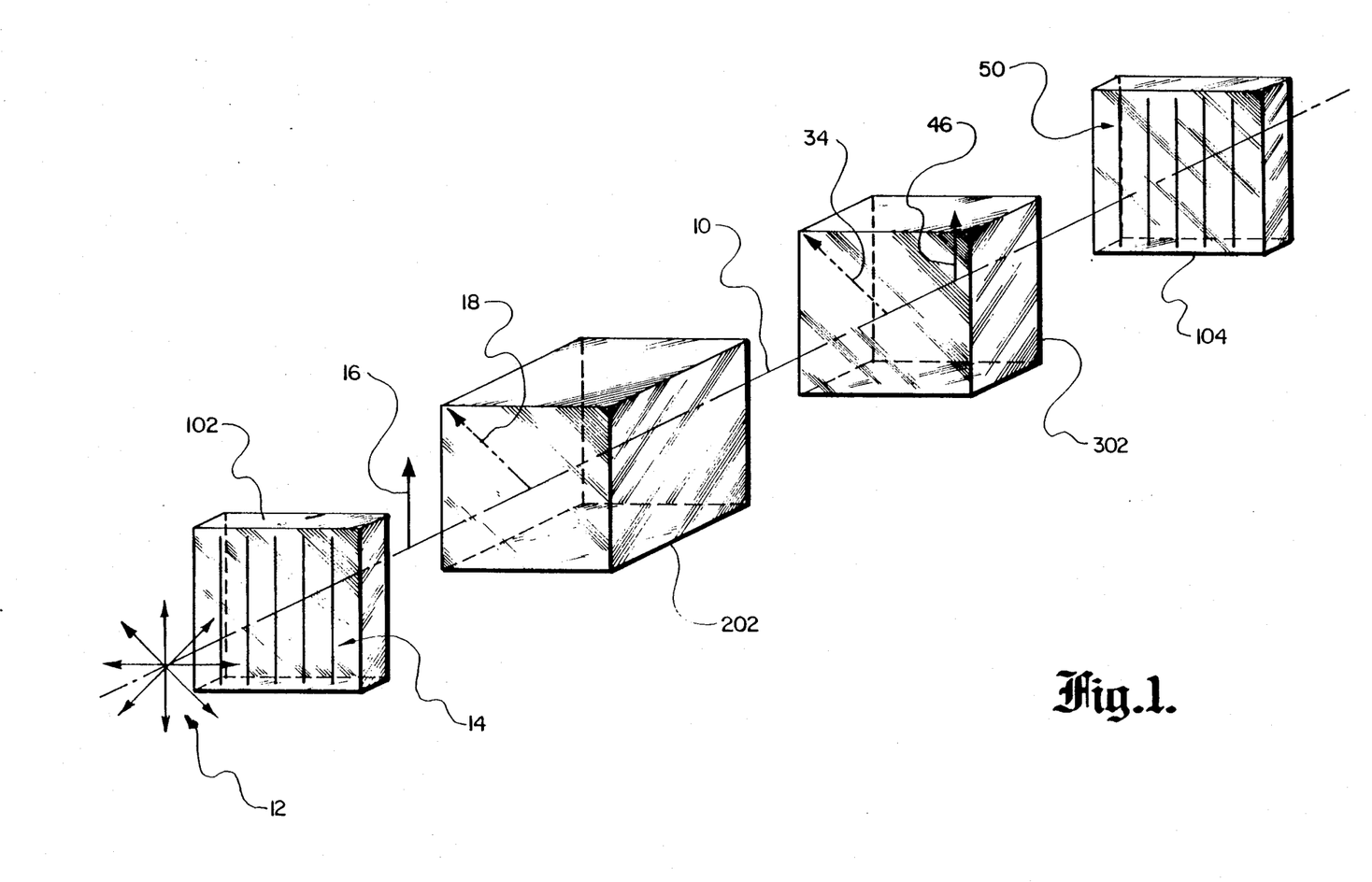
FIG. 1 is a perspective view of a birefringent filter constructed according to the present invention.

A typical embodiment of the invention is shown in a perspective view in FIG. 1. In this drawing, and in other similar drawings herein, the thicknesses of the component parts have been exaggerated relative to the other dimensions and the components have been separated in an exploded view in order to present the features of the invention as clearly as possible.

The optical filter of FIG. 1 includes a first polarizer 102 for transmitting light having a first polarization direction and a first birefringent element 202, with a birefringence $\Delta n_1$, for receiving the light transmitted by the first polarizer. A second birefringent element 302, with a birefringence $\Delta n_2$, receives the light transmitted by the first element and a second polarizer 104 receives the light transmitted by the second element and transmits the portion thereof having a second polarization direction. According to an outstanding feature of this invention, the birefringences and the thicknesses of the elements 202 and 302 are selected to effect a predetermined amount of net phase retardation for light of wavelength $\lambda$ in traversing the first and second elements.

In FIG. 1, the dotted line 10 represents a nominal path for light passing through the filter. Unpolarized, multispectral light is incident on the first polarizer 102, as indicated by the randomly oriented polarization vectors 12. The first polarizer is oriented with a polarization direction indicated by the lines 14. Thus, after emerging from the first polarizer, the radiation is limited to that portion of the light having a polarization parallel to the polarization direction of the polarizer, as represented by the vector 16. (Light with a vector of opposite direction would also pass through, but is eliminated from FIG. 1 for clarity.

Upon entering the first birefringent element 202, the light is resolved into an e component parallel to the c-axis 18 and an o component perpendicular to the c-axis. Since the e component will travel through the birefringent element 202 with greater velocity than the o component, the net effect will be to cause a change in the polarization of the light.

In the second birefringent element 302, which has a c-axis 34 parallel to the c-axis 18, the polarized light also experiences a phase retardation. In this instance, however, the birefringences of the elements 202 and 302 are of opposite sign, so that the polarization change in the second element proceeds in the opposite direction. The net phase retardation effected by the two elements 202 and 302 for light at the wavelength $\lambda$ is then represented by the polarization direction of the final polarization vector 46 in the second element. In the filter illustrated, the birefringences and the thicknesses of the two elements 202 and 302 have been selected so that this final polarization vector 46 is parallel to the initial polarization vector 16. Furthermore, the polarization direction of the second polarizer 104 is oriented parallel to that of the first polarizer 102, as indicated by the lines 50. Consequently, light at the wavelength $\lambda$ will have experienced precisely the phase retardation necessary to pass freely through the second polarizer, namely, zero phase retardation. Since the birefringent element materials are dispersive, light at wavelengths other than $\lambda$ will generally experience a different amount of phase retardation in traversing the filter and will be fully or partially blocked by the second polarizer. This device therefore operates as a bandpass filter with a passband at the wavelength $\lambda$.

The wavelength discrimination of this filter depends on the variation of $\Gamma$ as a function of wavelength and is normally expressed in terms of the differential phase retardation $\partial\Gamma/\partial\lambda$:

$$\frac{\partial\Gamma}{\partial\lambda} = \frac{2\pi}{\lambda}\left[ -\frac{\Delta n_1 d_1 + \Delta n_2 d_2}{\lambda} + \alpha_1 d_1 + \alpha_2 d_2 \right] \quad (4)$$

where $\alpha_1$ and $\alpha_2$ are the rates of dispersion of the birefringences with respect to $\lambda$, i.e.:

$$\alpha_1 = \frac{d}{d\lambda}\Delta n_1. \quad (5)$$

If such a plate combination is placed between a pair of parallel polarizers, the bandwidth $\Delta\lambda_{\frac{1}{2}}$ of the transmission is given by $$\Delta\lambda_{\frac{1}{2}} = \frac{\lambda}{2(\alpha_1 d_1 + \alpha_2 d_2)}. \quad (6)$$

For materials with a large dispersion, a narrow bandwidth ($\approx 1$Å) can easily be obtained with reasonable ($\approx 1$ cm) plate thicknesses.

The other performance factor of importance is the field-of-view. In order to accommodate a wide field-of-view, the overall phase retardation $\Gamma$ must be as independent of the angle of incidence as possible. This can be achieved by choosing two crystal materials with similar refractive indices, thus ensuring that the optical paths within the crystal maintain close to the ratio $d_1/d_2$ so that the iso-phase point $\lambda_o$ will be independent of the angle of incidence. Using electromagnetic theory, the phase retardation may be expressed as:

$$\Gamma = \frac{2\pi}{\lambda}(\Delta n_1 d_1 + \Delta n_2 d_2) - \quad (7)$$

$$\frac{2\pi}{\lambda}\left[\frac{\Delta n_1 d_1}{2n_1^2} + \frac{\Delta n_2 d_2}{2n_2^2}\right]\text{Sin}^2\theta(1 - 2\text{Sin}^2\phi)$$

where $n_1$ and $n_2$ are the averaged indices of refraction of the crystal, $\theta$ is the angle of incidence, and $\phi$ is the angle between the c-axes and the plane of incidence. Equation (7) indicates that $\Gamma$ will be nearly independent if $\theta$ and $\phi$ if $\Delta n_1 d_1 = \Delta n_2 d_2$ and $n_1 \approx n_2$. The field-of-view, according to Equation (7), is given by:

$$\theta = \left| \frac{\overline{\alpha}\Delta\lambda_{\frac{1}{2}}}{\Delta n_2\chi_1\left(\frac{1}{n_1^2} - \frac{1}{n_2^2}\right)} \right|^{\frac{1}{2}} \quad (8)$$

where $\Delta\lambda_{\frac{1}{2}}$ is the bandwidth, $\overline{\alpha}$ is the averaged rate of dispersion given by $$\overline{\alpha} = (\alpha_1 d_1 + \alpha_2 d_2)/(d_1 + d_2) \quad (9)$$

and $\chi_1$ is given by $$\chi_1 = d_1/(d_1 + d_2) \quad (10)$$

Equation (8) implies that the best birefringent crystal candidates for a wide field-of-view filter constructed according to this invention must exhibit strong dispersion (i.e., large $\overline{\alpha}$), small birefringence $\Delta n$, and similar refractive indices $n_1$ and $n_2$. Should it be difficult to find a pair of materials with similar refractive indices, a wide field element may alternatively be achieved by tailoring the plate thicknesses such that $$\frac{\Delta n_1 d_1}{2n_1^2} + \frac{\Delta n_2 d_2}{2n_2^2} = 0 \quad (11)$$

When equation (11) is satisfied, equation (7) implies that the phase retardation $\Gamma$ will be independent of the angle of incidence, at least to the accuracy of $\text{Sin}^2\theta$. In this case, the bandwidth $\Delta\lambda_{\frac{1}{2}}$ should be:

$$\Delta\lambda_{\frac{1}{2}} = \frac{\lambda}{2(\alpha_1 d_1 + \alpha_2 d_2) - (\Delta n_1 d_1 + \Delta n_2 d_2)/\lambda} \quad (12)$$

In the normal dispersion regime, $\alpha$ and $\Delta n/\lambda$ will be of the same sign. Consequently, a narrower bandwidth may be realized by operating such a filter away from the iso-phase point.

One particular example of a filter which could be constructed according to this invention utilizes rutile ($TiO_2$) and lead titanate ($PbTiO_3$). $TiO_2$ has a positive birefringence of $\Delta n_1 = 0.325$, a dispersion $\alpha_1$ of $5 \times 10^{-5}$ Å$^{-1}$, and an index of refraction $n_1 = \sqrt{n_o n_e} = 2.76$ at $\lambda = 4880$ Å. At the same wavelength, $PbTiO_3$ exhibits a negative birefringence of $\Delta n_2 = -0.0186$, a dispersion $\alpha_2 = 1.17 \times 10^{-5}$ Å$^{-1}$, and a refractive index $n_2 = 2.78$. A one angstrom filter using these materials would require a $TiO_2$ plate thickness of $d_2 = 2.7476$ cm. The field-of-view for this filter, calculated from equation (8), would be $\theta = 30°$. As compared with a conventional quartz wide field filter, this filter exhibits a larger field of view with a thinner structure, yet does not require any achromatic half-wave plates.

Another particular example of a filter constructed according to this invention is a CdS and PbTiO$_3$ filter designed for a passband at $\lambda = 5325$ Å. A one angstrom bandwidth would require plate thicknesses of $d_1 = 3.58$ mm for CdS and $d_2 = 1.56$ mm for PbTiO$_3$. The field-of-view for this filter. may be calculated as $\theta = 66°$.

Many different filter embodiments may be realized utilizing the teaching of this invention. The birefringences and the thicknesses of the two elements in the filter of FIG. 1, for example, are selected to achieve a net phase retardation of zero. Those skilled in the art, however, will appreciate that the equations governing the phase difference (equations (2) and (3)) imply useful filter designs where the net phase retardation is any integral multiple of $\pi$. A phase difference of an even multiple of $\pi$ will behave exactly as zero phase difference. A phase retardation of an odd multiple of $\pi$ will transform the light into linear vibrations perpendicular to the incident vibrations where the optical axes are oriented 45° away from the incident vibration. Thus a filter like that shown in FIG. 1, with parallel polarizers, will act as a stop band filter at the design wavelength when the net phase retardation effected by the birefringent elements is equal to an off multiple of $\pi$. By crossing the polarizers, this filter can be made to perform as a bandpass filter. For the widest possible field-of-view, however, the net phase retardation should be zero.

Another variation is possible where two birefringent materials having birefringences of the same sign are available. If the birefringent elements are placed with crossed optic axes, then equation (3) for the overall phase retardation $\Gamma$ becomes $$\Gamma = \Gamma_1 - \Gamma_2 = \frac{2\pi}{\lambda}(\Delta n_1 d_1 - \Delta n_2 d_2). \quad (13)$$

Figure 2:
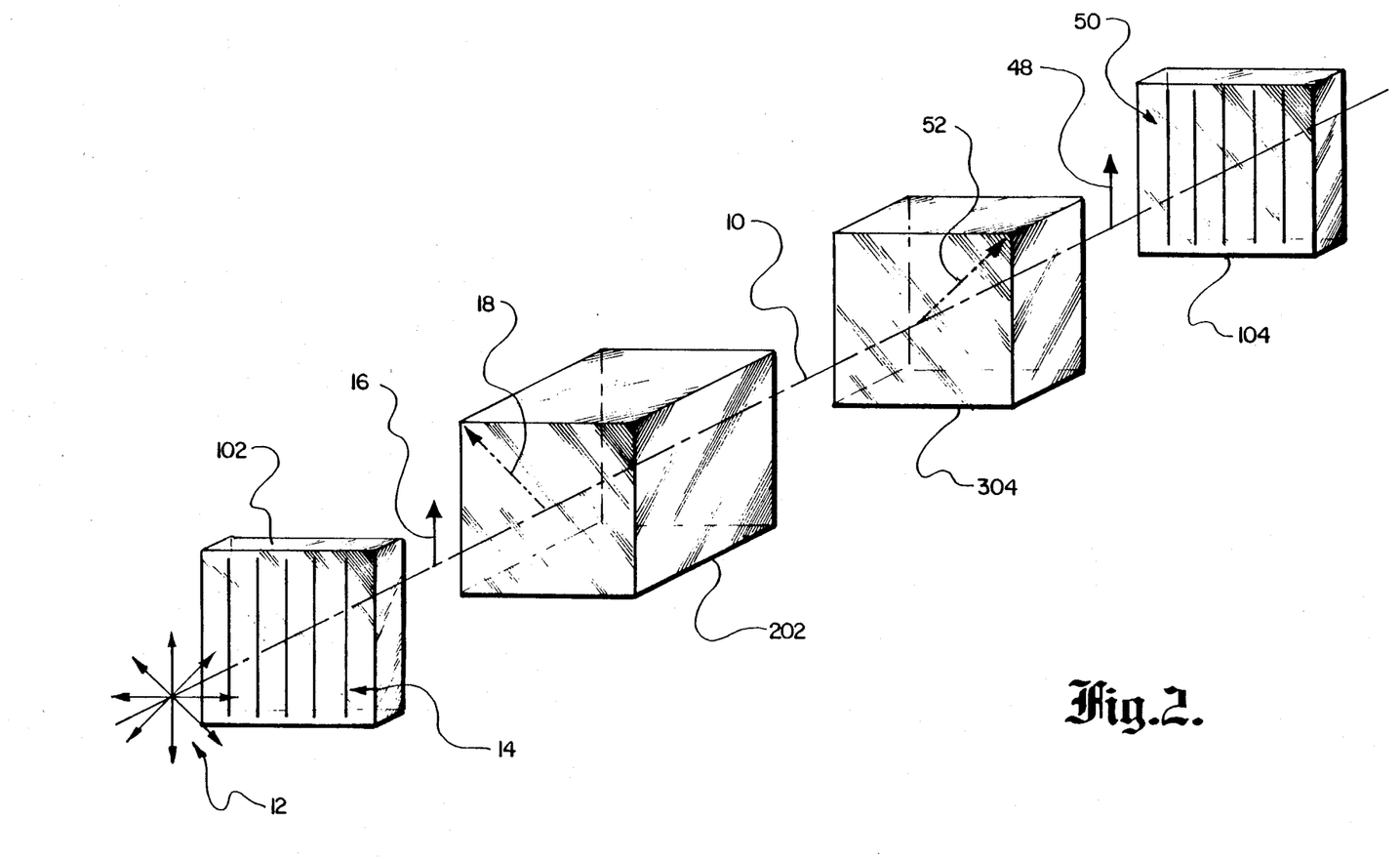
FIG. 2 is a perspective view of a filter similar to that of FIG. 1, except that the c-axes of the birefringent elements are perpendicular.

Consider, for example, the filter shown in FIG. 2, which is an exploded perspective view similar to FIG. 1 except that the c-axis 52 of the second birefringent element 304 is oriented perpendicular to the c-axis 18 of the first element 202. Furthermore, the birefringences $\Delta n_1$ and $\Delta n_2$ of the elements are of the same sign. With those two differences, the filter of FIG. 2 operates in the same manner as that of FIG. 1, i.e., the birefringences and the thicknesses of the elements 202 and 304 are selected to effect a predetermined amount of net phase retardation for light at a wavelength $\lambda$ in traversing the elements.

Figure 3:
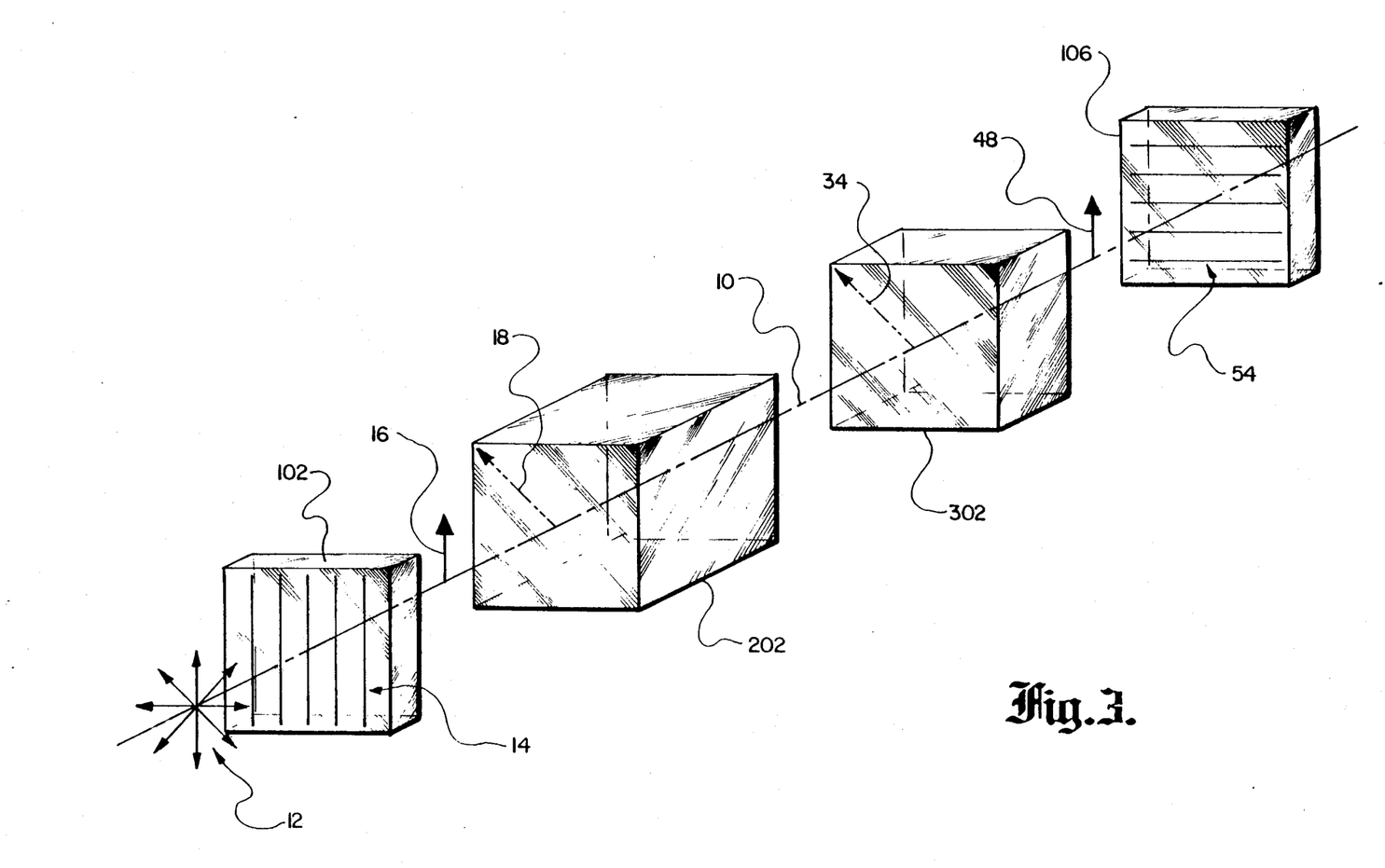
FIG. 3 is also a perspective view of a filter similar to FIG. 1, but with crossed polarizers.

FIG. 3 is a perspective view of another filter similar to that of FIG. 1, the only difference being that in the filter of FIG. 3 the second polarizer 106 is oriented perpendicular to the first polarizer 102, as indicated by the lines 54. This rotation of the second polarizer causes the filter of FIG. 3 to operate as a stopband filter where the net phase retardation is an even multiple of $\pi$ or, as mentioned above, the filter will operate as a bandpass filter if the net phase retardation is an odd multiple of $\pi$. Again, however, the field-of-view where $\Gamma = \pi, 2\pi, 3\pi,$ ... will not be as large as in the iso-phase case, where $\Gamma = 0$.

Figure 4:
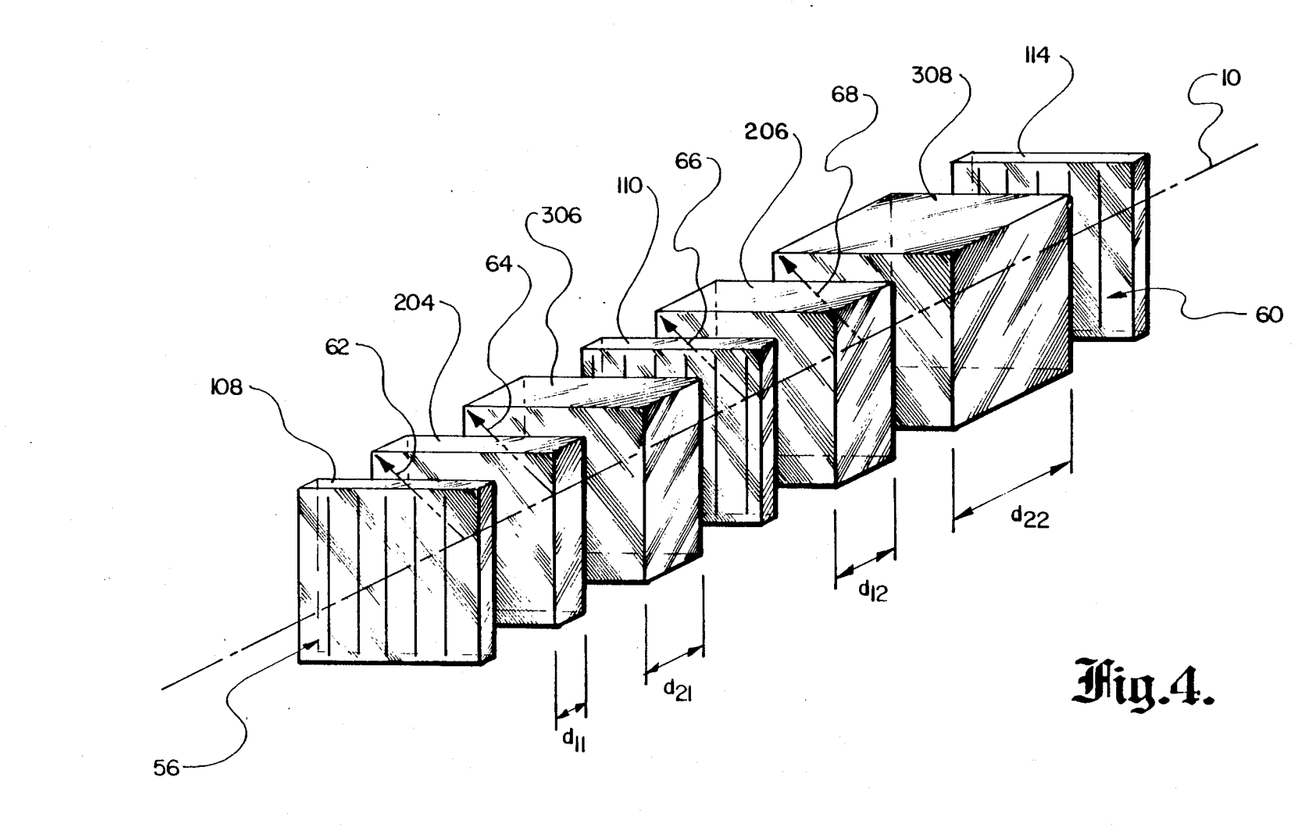
FIG. 4 is a perspective view of a two stage Lyot Ohman filter constructed according to the present invention.

As those skilled in the art will appreciate, practical Lyot-Ohman filters normally incorporate several stages, with the birefringent element in each stage twice the thickness of that in the preceding stage. This results in a transmission spectrum consisting of isolated transmission bands whose width is determined by the thickest stage while the free spectral range is set by the thinnest stage. A two stage Lyot Ohman filter conforming to the present invention is shown in FIG. 4 in an exploded perspective view. The first stage of this filter includes a first birefringent element 204 of birefringence $\Delta n_1$, and a second birefringent element 306 of birefringence $\Delta n_2$. Again, the birefringence and the thicknesses of the elements effect a zero net phase retardation for light at a wavelength $\lambda$ in traversing the first stage. The second stage includes a first birefringent element 206 of birefringence $\Delta n_1$ and a second birefringent element 308 of birefringence $\Delta n_2$. Again, the birefringences and the thicknesses of the elements 206 and 308 effect a zero net phase retardation for light at the wavelength $\lambda$. In addition, the thickness of each element in each stage is twice that of the corresponding element in the preceding stage, i.e., $d_{12} = 2d_{11}$, and $d_{22} = 2d_{21}$. An initial polarizer 108 precedes the first stage for transmitting light having a particular polarization direction, as indicated by the lines 56. An intermediate polarizer 110 is located between the stages for transmitting light having that same polarization direction, as indicated by the lines 58. A final polarizer 114 follows the second stage to transmit light having that polarization direction, as shown by the lines 60. The c axes 62, 64, 66, and 68 are shown oriented parallel to each other, which would be the arrangement where $\Delta n_1$ and $\Delta n_2$ are of opposite sign. In accordance with the discussion above, however, those skilled in the art will appreciate that birefringent materials of the same sign could be used in conjunction with crossed c-axes (axes 64 and 68 perpendicular to axes 62 and 66).

Figure 5:
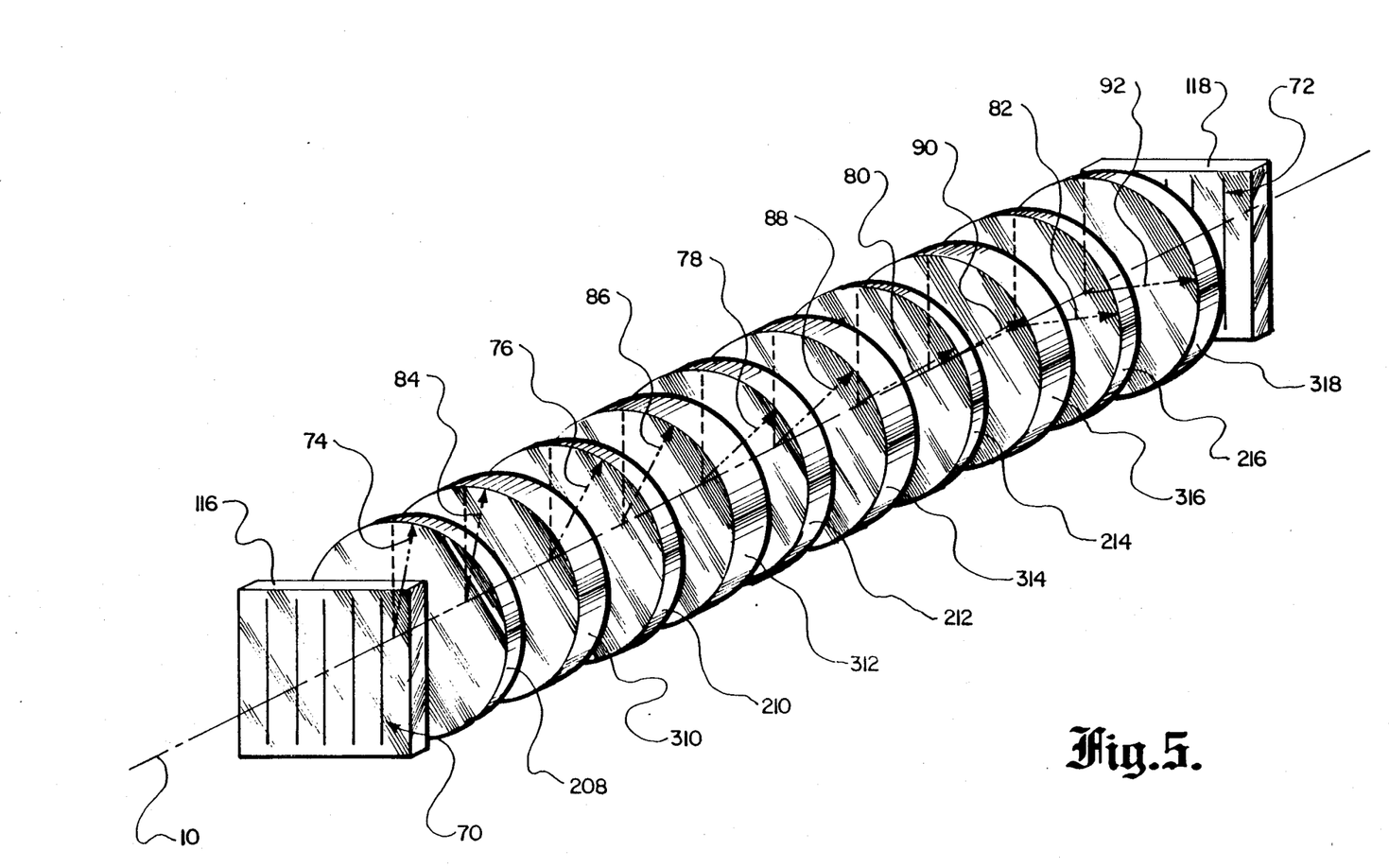
FIG. 5 is a perspective view of a five stage fan Solc filter constructed according to the present invention.

FIG. 5 is an exploded, perspective view of another type of birefringent filter known as a fan Solc filter. The five stage embodiment illustrated includes an initial polarizer 116 for transmitting light having a first polarization direction, as indicated by the lines 70, and a final polarizer 118 for transmitting light having a second polarization direction, shown by the lines 72. The filter stages are disposed between the polarizers, with each stage including a first birefringent element, with a birefringence $\Delta n_1$, a first thickness, and a first optic axis, and a second birefringent element, having a birefringence $\Delta n_2$, a second thickness, and a second optic axis. The birefringences and the thicknesses of the elements in each stage effect a zero net phase retardation for light at a wavelength $\lambda$ in traversing that stage. The first optic axis in the nth stage makes an angle of $\rho(2n-1)$ with respect to the first polarization direction. where $\rho = 45°/N$ and N is the total number of stages. Thus $\rho = 45°/5 = 9°$ in FIG. 5 and the optic axis 74 of the first element 208 in the first stage is angled at 9° with respect to the first polarization direction. Likewise, the optic axes 76, 78, 80, and 82 of the first elements 210, 212, 214, and 216 in the second, third, fourth, and fifth stages are angled at 27°, 45°, 63°, and 81°, respectively. If the birefringence $\Delta n_2$ is opposite in sign with respect to $\Delta n_1$, each second element optic axis is parallel to the first element optic axis for that stage, i.e., the optic axes 84, 86, 88, 90, and 92 of the second elements 310, 312, 314, 316, and 318 in the first through fifth stages would be parallel to the optic axes 74, 76, 78, 80, and 82, respectively. Where birefringent materials of the same sign in birefringence are used, the second element optic axes would be placed perpendicular to the respective first element optic axes. If the polarization direction of the final polarizer 118 is parallel to that of the initial polarizer 116, the device will operate as a bandpass filter, while crossed polarizers will yield a stop band filter.

Figure 6:
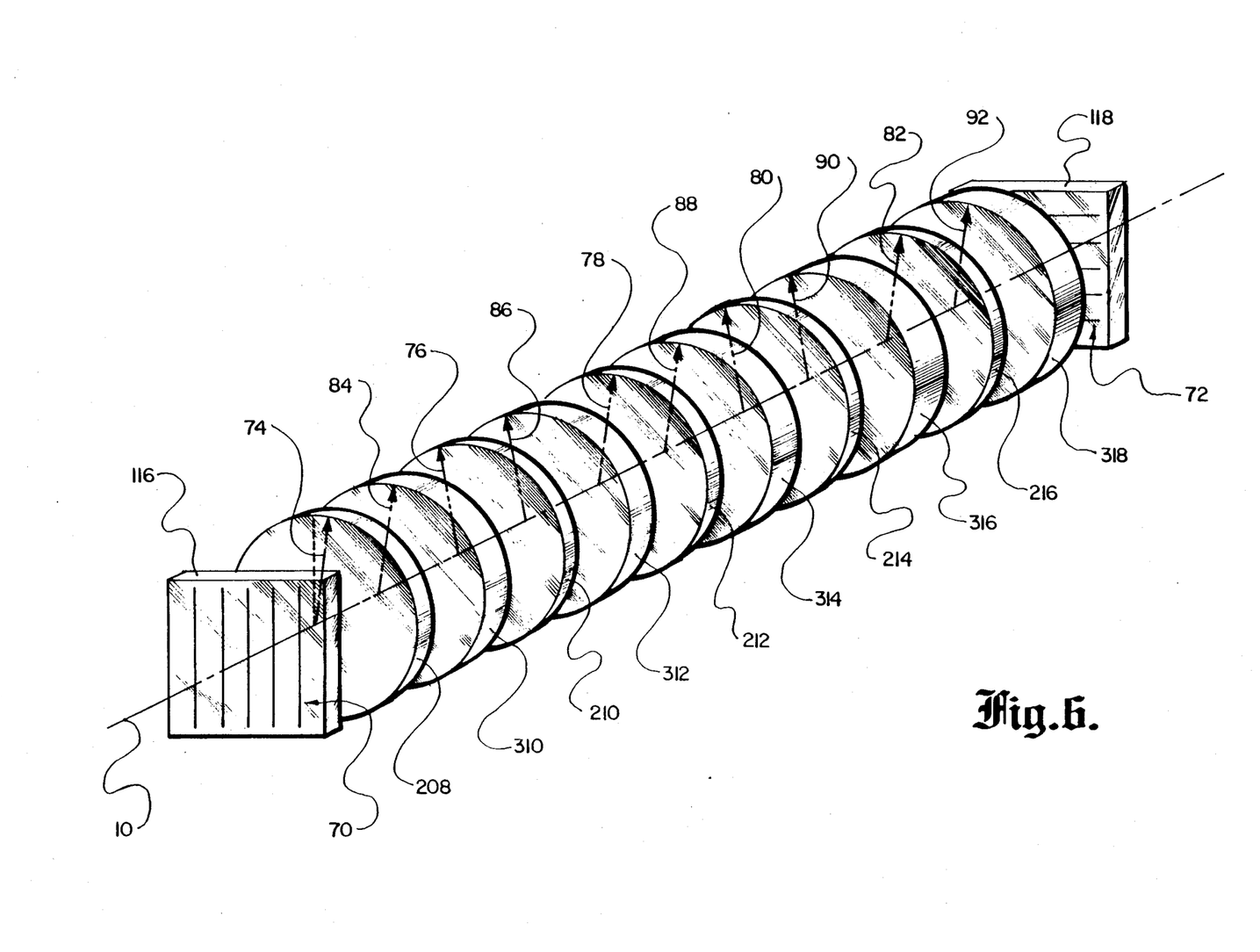
FIG. 6 is a perspective view of a five stage folded Solc filter constructed according to the present invention.

Another type of Solc filter, the folded Solc, is shown in an exploded perspective view in FIG. 6. Here the initial polarizer 116, the final polarizer 118, the first birefringent elements 208, 210, 212, 214, and 216, and the second birefringent elements 310, 312, 314, 316, and 318 are analagous to the same elements in the filter of FIG. 5, with the birefringences and thicknesses effecting a zero net phase retardation for light at a wavelength $\lambda$ in traversing each stage. In the folded design, however, the first optic axis in the nth stage is rotated $(-1)^{n-1}\rho$ with respect to the first polarization direction, where $\rho=45°/N$ and N is the total number of stages. Thus, for the five stage embodiment in FIG. 6, the c-axes 74, 78, and 82 are rotated 9° and the c-axes 76 and 80 are rotated $-9°$ away from the first polarization direction. Again, where the signs of birefringence are opposite for the first and second elements, the c-axes 84, 86, 88, 90, and 92 are parallel to the axes 74, 76, 78, 80, and 82, respectively, while if the signs of birefringence are the same, the c-axes within each stage are perpendicular. For the folded Solc design, maximum transmission for the wavelength $\lambda$ occurs when the second polarization direction, as indicated by the lines 72, is perpendicular to the first polarization direction, resulting in a bandpass filter. A stopband filter is achieved by placing the initial and final polarizers with their polarization directions parallel.

In conclusion, although several different embodiments of the invention have been described, modifications and additional embodiments will undoubtedly be apparent to those skilled in the art. The teachings of this invention, for example, might be applied to the design of wide field and split element Lyot filters. In general, equivalent elements may be substituted for those described herein, parts might be interchanged, connections might be reversed, and certain features of the invention might be used independently of other features. Consequently, the particular examples which have been presented should be considered as illustrative only and not inclusive, the appended claims being more indicative of the full scope of the invention.

What is claimed is:

1. An optical filter, comprising:
   a first polarizer for transmitting light having a first polarization direction;
   a first birefringent element, with a birefringence $\Delta n_1$, for receiving the light transmitted by said first polarizer;
   a second birefringent element, with a birefringence $\Delta n_2$, different from $\Delta n_1$, for receiving the light transmitted by said first element; and
   a second polarizer for receiving the light tranmitted by said second element and transmitting the portion thereof having a second polarization direction,
   said birefringences and the thicknesses of said elements effecting a net phase retardation of $n\pi$ radians, where n=0, 1, 2, . . ., for light of wavelength $\lambda$ in traversing said first and second elements.

2. The filter of claim 3, wherein said birefringences and said thicknesses effect a net phase retardation of $2n\pi$ radians for light at said wavelength $\lambda$.

3. The filter of claim 4, wherein said birefringences and said thicknesses effect a zero net phase retardation for light at said wavelength $\lambda$.

4. The filter of claim 1, wherein the optic axis of said first element is rotated 45° with respect to said first polarization direction, the optic axis of said second element is parallel to said first element optic axis, and said birefringences $\Delta n_1$ and $\Delta n_2$ are of opposite sign.

5. The filter of claim 6, wherein said second polarization direction is parallel to said first polarization direction.

6. The filter of claim 6, wherein said second polarization direction is perpendicular to said first polarization direction.

7. The filter of claim 1, wherein the optic axis of said first element is rotated 45° with respect to said first polarization direction, the optic axis of said second element is perpendicular to said first element optic axis, and said birefringences $\Delta n_1$ and $\Delta n_2$ are of the same sign.

8. The filter of claim 7, wherein said second polarization direction is parallel to said first polarization direction.

9. The filter of claim 7, wherein said second polarization direction is perpendicular to said first polarization direction.

10. An optical filter, comprising:
    a first polarizer for transmitting light having a first polarization direction;
    a first birefringent element, with a birefringence $\Delta n_1$, a first thickness, and an optic axis rotated 45° with respect to said first polarization direction, for receiving the light transmitted by said first polarizer;
    a second birefringent element, with a birefringence $\Delta n_2$, a second thickness, and an optic axis parallel to the optic axis of said first element, for receiving the light transmitted by said first element; and
    a second polarizer for receiving the light transmitted by said second element and transmitting the portion thereof having said first polarization direction,
    said birefringences being of opposite sign and thereby, in conjunction with said thicknesses, effecting a zero net phase retardation for light at a wavelength $\lambda$ in traversing said first and second elements.

11. An optical filter, comprising:
    a first polarizer for transmitting light having a first polarization direction;
    a first birefringent element, with a birefringence $\Delta n_1$, a first thickness, and an optic axis rotated 45° with respect to said first polarization direction, for receiving the light transmitted by said first polarizer;
    a second birefringent element, with a birefringence $\Delta n_2$ different from $\Delta n$, a second thickness, and an optic axis perpendicular to the optic axis of said first element, for receiving the light transmitted by said first element; and
    a second polarizer for receiving the light transmitted by said second element and transmitting the portion thereof having said first polarization direction,
    said birefringences being of the same sign and thereby, in conjunction with said thicknesses, effecting a zero net phase retardation for light at a wavelength $\lambda$ in traversing said first and second elements.

12. An optical filter, comprising:
    a plurality of filter stages, each stage including:
    a first birefringent element of birefringence $\Delta n_1$ and a first thickness, and
    a second birefringent element of birefringence $\Delta n_2$ different from $\Delta n$, and a second thickness,
    the birefringences and the thicknesses of said elements effecting a zero net phase retardation for light at a wavelength $\lambda$ in traversing said stage, the thickness of each element in each stage being twice that of the corresponding element in the preceding stage;

an initial polarizer preceding the first of said stages for transmitting light having a particular polarization direction;

an intermediate polarizer disposed between each stage and the preceding stage for transmitting light having said polarization direction; and a final polarizer following the last of said stages for transmitting light having said polarization direction.

13. The filter of claim 12, wherein the optic axes of said first elements are rotated 45° with respect to said polarization direction, the optic axes of said second elements are parallel to said first element optic axes, and said birefringences $\Delta n_1$ and $\Delta n_2$ are of opposite sign.

14. The filter of claim 12, wherein the optic axes of said first elements are rotated 45° with respect to said polarization direction, the optic axes of said second elements are perpendicular to said first element optic axes, and said birefringences $\Delta n_1$ and $\Delta n_2$ are of the same sign.

15. An optical filter, comprising:
a plurality of filter stages, each stage including:
  a first uniaxial element of birefringence $\Delta n_1$ and
  a second uniaxial element of birefringence $\Delta n_2$ opposite in sign with respect to said birefringence $\Delta n_1$,
  the birefringences and the thicknesses of said elements effecting a zero net phase retardation for light at a wavelength $\lambda$ in traversing said stage,
the thickness of each element in each stage being twice that of the corresponding element in the preceding stage;
an initial polarizer preceding the first of said stages for transmitting light having a polarization direction rotated 45° with respect to the optic axes of said first elements and said second elements, said first element and second element optic axes all being parallel;
an intermediate polarizer disposed between each stage and the preceding stage for transmitting light having said polarization direction; and
a final polarizer following the last of said stages for transmitting light having said polarization direction.

16. An optical filter, comprising:
a plurality of filter stages, each stage including:
  a first uniaxial element of birefringence $\Delta n_1$ and
  a second uniaxial element of birefringence $\Delta n_2$ different from $\Delta n$, but having the same sign as $\Delta n_1$,
  the birefringences and the thicknesses of said elements effecting a zero net phase retardation for light at a wavelength $\lambda$ in traversing said stage,
the thickness of each element in each stage being twice that of the corresponding element in the preceding stage;
an initial polarizer preceding the first of said stages for transmitting light having a polarization direction rotated 45° with respect to the optic axes of said first elements and said second elements, all of said first element optic axes being perpendicular to all of said second element optic axes;
an intermediate polarizer disposed between each stage and the preceding stage for transmitting light having said polarization direction; and a final polarizer following the last of said stages for transmitting light having said polarization direction.

17. An optical filter, comprising:
an initial polarizer for transmitting light having a first polarization direction;
a final polarizer for transmitting light having a second polarization direction;
a plurality of filter stages disposed between said polarizers, each stage including:
  a first birefringent element having a birefringence $\Delta n_1$, a first thickness, and a first optic axis, and
  a second birefringent element having a birefringence $\Delta n_2$ different from $\Delta n$, a second thickness, and a second optic axis,
  said birefringences and said thicknesses effecting a zero net phase retardation for light at a wavelength $\lambda$ in traversing said stage;
said first optic axis in the nth stage making an angle of $92(2n-1)$ with respect to said first polarization direction, where $\rho = 45°/N$ and N is the total number of said stages.

18. The filter of claim 17, wherein said birefringence $\Delta n_2$ is opposite in sign with respect to said birefringence $\Delta n_1$ and wherein said second optic axis for each stage is parallel to said first optic axis for that stage.

19. The filter of claim 17, wherein said birefringence $\Delta n_2$ is of the same sign as said birefringence $\Delta n_1$ and wherein said second optic axis for each stage is perpendicular to said first optic axis for that stage.

20. The filter of claim 17, wherein said second polarization direction is parallel to said first polarization direction.

21. The filter of claim 17, wherein said second polarization direction is perpendicular to said first polarization direction.

22. An optical filter, comprising:
an initial polarizer for transmitting light having a first polarization direction;
a final polarizer for transmitting light having a second polarization direction;
a plurality of filter stages disposed between said polarizers, each stage including:
  a first birefringent element having a birefringence $\Delta n_1$, a first thickness, and a first optic axis, and
  a second birefringent element having a birefringence $\Delta n_2$ different from $\Delta n$, a second thickness, and a second optic axis,
  said birefringences and said thicknesses effecting a zero net phase retardation for light at a wavelength $\lambda$ in traversing said stage;
said first optic axis in the nth stage making an angle of $(-1)^{n-1}\rho$ with respect to said first polarization direction, where $\rho = 45°/N$ and N is the total number of said stages.

23. The filter of claim 22, wherein said birefringence $\Delta n_2$ is opposite in sign with respect to said birefringence $\Delta n_1$ and wherein said second optic axis for each stage is parallel to said first optic axis for that stage.

24. The filter of claim 22, wherein said birefringence $\Delta n_2$ is of the same sign as said birefringence $\Delta n_1$ and wherein said second optic axis for each stage is perpendicular to said first optic axis for that stage.

25. The filter of claim 22, wherein said second polarization direction is parallel to said first polarization direction.

26. The filter of claim 22, wherein said second polarization direction is perpendicular to said first polarization direction.

* * * * *